(12) United States Patent
Moriyuki et al.

(10) Patent No.: US 10,591,317 B2
(45) Date of Patent: Mar. 17, 2020

(54) ENCODER APPARATUS AND MOTION GUIDE APPARATUS WITH ENCODER APPARATUS

(71) Applicant: THK CO., LTD., Tokyo (JP)

(72) Inventors: Yoshinobu Moriyuki, Tokyo (JP); Takashi Oshida, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/084,164

(22) PCT Filed: Feb. 16, 2017

(86) PCT No.: PCT/JP2017/005630
§ 371 (c)(1),
(2) Date: Sep. 11, 2018

(87) PCT Pub. No.: WO2017/159196
PCT Pub. Date: Sep. 21, 2017

(65) Prior Publication Data
US 2019/0346286 A1   Nov. 14, 2019

(30) Foreign Application Priority Data
Mar. 15, 2016   (JP) .................................. 2016-050530

(51) Int. Cl.
*G01D 5/20* (2006.01)
*G01D 5/244* (2006.01)
*G01D 5/245* (2006.01)

(52) U.S. Cl.
CPC ......... *G01D 5/2053* (2013.01); *G01D 5/2457* (2013.01); *G01D 5/24438* (2013.01)

(58) Field of Classification Search
CPC ............... G01D 5/2053; G01D 5/2457; G01D 5/24438; G01D 5/206; G01D 5/2066; G01D 5/2458
See application file for complete search history.

(56) References Cited

U.S. PATENT DOCUMENTS 5,004,982 A * 4/1991 Chaney ................ G01B 5/0009
                                                    324/207.22
6,002,250 A * 12/1999 Masreliez ............ G01D 5/2053
                                                    324/207.16
(Continued)

FOREIGN PATENT DOCUMENTS

CN         1201138      12/1998
CN       101504293       8/2009
(Continued)

OTHER PUBLICATIONS

Chinese Office Action for Application No. 201780016419.8, dated Jan. 11, 2019, with English translation provided.
(Continued)

*Primary Examiner* — Lee E Rodak
(74) *Attorney, Agent, or Firm* — Young & Thompson (57) ABSTRACT

Provided is an encoder device capable of reducing interference between a magnetic field generated in a reference mark and a magnetic field generated in a scale. An encoder device is provided with a reference mark and a head. The reference mark has: a first scale coil; and a second scale coil electrically connected to the first scale coil. The head has: a transmission coil that transmits an electromagnetic wave without any contact to the first scale coil; a reception coil that receives an electromagnetic wave without any contact from the second scale coil; and electric circuits that generate a pulse for generating an origin signal from the electromagnetic wave received by the reception coil, if the transmission coil faces the first scale coil and the reception coil faces the second scale coil.

13 Claims, 6 Drawing Sheets

(56) References Cited

U.S. PATENT DOCUMENTS

| | | | | |
|---|---|---|---|---|
| 6,335,618 B1* | 1/2002 | Nahum | | G01B 3/205 |
| | | | | 324/207.17 |
| 6,342,697 B1* | 1/2002 | Nagai | | H03M 1/308 |
| | | | | 250/231.13 |
| 6,545,461 B1* | 4/2003 | Miyata | | G01D 5/2053 |
| | | | | 324/207.17 |
| 2002/0017902 A1* | 2/2002 | Vasiloiu | | G01D 5/2046 |
| | | | | 324/207.17 |
| 2002/0129508 A1 | 9/2002 | Blattner et al. | | |
| 2008/0265826 A1* | 10/2008 | Sasaki | | G01D 5/2013 |
| | | | | 318/687 |
| 2009/0195241 A1 | 8/2009 | Nakayama et al. | | |
| 2010/0207617 A1 | 8/2010 | Novak et al. | | |
| 2011/0095658 A1 | 4/2011 | Takeuchi | | |
| 2011/0254541 A1 | 10/2011 | Sasaki | | |
| 2013/0021024 A1 | 1/2013 | Sasaki | | |
| 2015/0015245 A1 | 1/2015 | Inoue et al. | | |
| 2016/0084676 A1 | 3/2016 | Moriyuki et al. | | |
| 2017/0016483 A1 | 1/2017 | Sakagami | | |
| 2018/0052298 A1* | 2/2018 | Sueoka | | G03B 13/34 |

FOREIGN PATENT DOCUMENTS

| | | |
|---|---|---|
| CN | 102045016 A | 5/2011 |
| CN | 102252702 | 11/2011 |
| CN | 102889899 | 1/2013 |
| CN | 105190250 | 12/2015 |
| DE | 3826561 | 2/1990 |
| DE | 19730259 | 2/1999 |
| DE | 19922363 | 11/2000 |
| EP | 0964225 | 12/1999 |
| JP | H10-2758 A | 1/1998 |
| JP | 2005-124376 A | 5/2005 |
| JP | 2011-089898 A | 5/2011 |
| JP | 2013-255331 A | 12/2013 |
| TW | 201344159 A | 11/2013 |
| WO | 2009-053719 A2 | 4/2009 |
| WO | 2015-078860 A1 | 6/2015 |
| WO | 2015-137325 | 9/2015 |

OTHER PUBLICATIONS

International Search Report, dated Apr. 18, 2017, from corresponding PCT application No. PCT/JP2017/005630.

Decision to Grant a Patent, dated Oct. 17, 2017, from corresponding JP application No. 2016-050530.

TW Office Action, dated Jul. 27, 2018, from corresponding TW application No. 106107188.

German Office Action for Application No. 11 2017 000 908.1, dated Apr. 2, 2019, with English translation provided.

* cited by examiner

ENCODER APPARATUS AND MOTION GUIDE APPARATUS WITH ENCODER APPARATUS

TECHNICAL FIELD

The present invention relates to an encoder apparatus for detecting relative linear positions or rotation positions of two members that can move relatively.

BACKGROUND ART

An encoder apparatus is used to detect a linear position or rotation position of a second member that moves relatively to a first member. There are incremental encoder apparatuses that output pulses whose number corresponds to a travel amount, and absolute encoder apparatuses that output data of an absolute position of a detected position.

The incremental encoder apparatus includes a scale attached to the first member, and a head attached to the second member to read the scale. The incremental encoder apparatus outputs an A-phase signal and a B-phase signal that are π/2 out of phase with the relative movement of the second member to the first member.

The incremental encoder apparatus outputs an origin signal (a Z-phase signal) in addition to the A-phase signal and the B-phase signal. This is because the incremental encoder apparatus has a problem that even if the power is turned off and then turned on again, the current position cannot be determined immediately.

In an encoder apparatus described in Patent Literature 1, a reference mark (made of a magnet or iron) is attached in an origin position of the first member, and a magnetic sensor that reads the reference mark is attached to the second member, in order to output the origin signal. A signal obtained from the magnetic sensor is compared with a predetermined threshold to generate a pulse for the origin signal. The origin signal is outputted on the basis of the pulse.

CITATION LIST

Patent Literature

Patent Literature 1: WO 2009/053719 A

SUMMARY OF INVENTION

Technical Problem

However, in the encoder apparatus described in Patent Literature 1, the scale is a magnetic scale. Accordingly, there is a problem that a magnetic field generated on the reference mark made of a magnet or iron and a magnetic field generated on the scale may interfere with each other and accordingly a measurement error may occur.

Hence, an object of the present invention is to provide an encoder apparatus that can reduce the interference between the magnetic field of the reference mark and the magnetic field of the scale.

Solution to Problem

In order to solve the above issue, an aspect of the present invention is an encoder apparatus including: a reference mark; and a head, wherein the reference mark includes a first scale coil, and a second scale coil electrically connected to the first scale coil, and the head includes a transmitting coil configured to transmit an electromagnetic wave to the first scale coil in a non-contact manner, a receiving coil configured to receive the electromagnetic wave from the second scale coil in a non-contact manner, and an electric circuit configured to generate a pulse for generating an origin signal from the electromagnetic wave received by the receiving coil upon the transmitting coil facing the first scale coil and the receiving coil facing the second scale coil.

Advantageous Effects of Invention

According to the present invention, a pulse for generating an origin signal can be generated using electromagnetic induction. A magnetic field generated on a reference mark and a magnetic field generated on a scale due to electromagnetic induction can be isolated according to the frequencies. Therefore, interference between the magnetic field of the reference mark and the magnetic field of the scale can be reduced.

The present invention is suitable in a case where the scale is a magnetic scale. However, the scale is not limited to a magnetic scale, and may be, for example, an optical scale.

BRIEF DESCRIPTION OF DRAWINGS

FIGS. 6A1 to 6B2 are diagrams comparing the size of a head between the embodiment and a comparative example (FIGS. 6A1 and 6A2 illustrate the comparative example, and FIGS. 6B1 and 6B2 illustrate the embodiment).

DESCRIPTION OF EMBODIMENTS

An encoder apparatus according to one embodiment of the present invention is described in detail hereinafter with reference to the accompanying drawings. However, the encoder apparatus of a motion guide apparatus of the present invention can be embodied in various forms, and is not limited to the embodiment described in the description. The embodiment is provided with the intention of fully disclosing the description to enable those skilled in the art to fully understand the scope of the invention.

Figure 1:
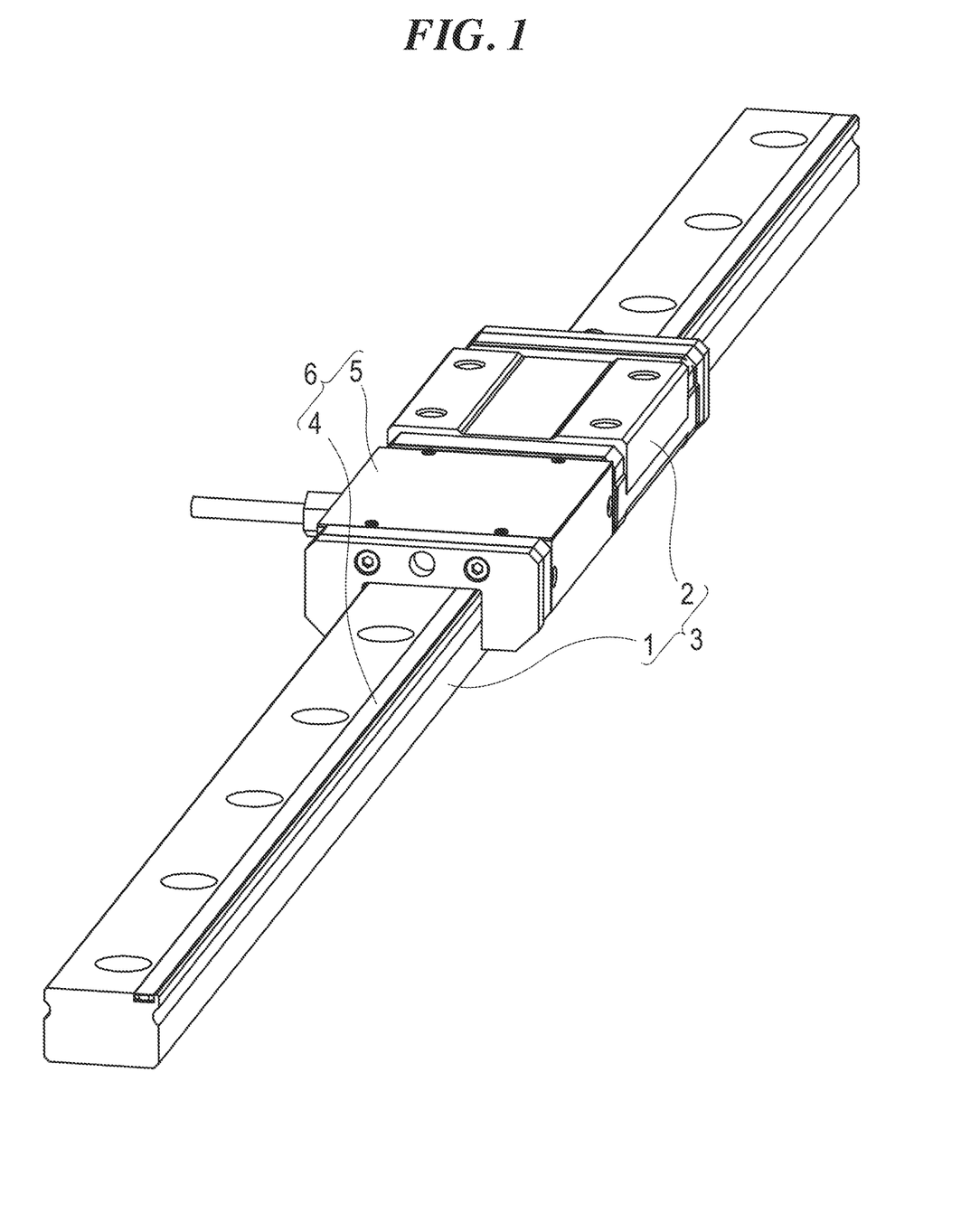
FIG. 1 is an external perspective view of a motion guide apparatus with an encoder apparatus to which an encoder apparatus according to a first embodiment of the present invention has been attached.

FIG. 1 illustrates an external perspective view of a motion guide apparatus with an encoder apparatus to which the encoder apparatus according to the embodiment has been attached. A reference sign 3 denotes a motion guide apparatus, and a reference sign 6 denotes an encoder apparatus.

The motion guide apparatus 3 includes a track rail 1, and a carriage 2 that is assembled to the track rail 1 in such a manner as to be movable in a length direction of the track rail 1. The track rail 1 is attached to an unillustrated base, and the carriage 2 is attached to an unillustrated movable body such as a table. The motion guide apparatus 3 is built in a machine tool, a semiconductor manufacturing apparatus, a liquid crystal manufacturing apparatus, a robot, or the like, and guides the linear motion of the movable body such as a table. Multiple rolling elements are disposed between the track rail 1 and the carriage 2 in such a manner as to be capable of rolling motion. When the carriage 2 moves with respect to the track rail 1, the rolling elements roll between them. The carriage 2 can be moved smoothly with high accuracy by using the rolling of the rolling elements. The configuration of the motion guide apparatus 3 is known. Accordingly, a further detailed description is omitted.

The encoder apparatus 6 includes an incremental magnetic scale (hereinafter simply referred to as the magnetic scale 4), a reference mark 7 (refer to FIG. 2), and a head 5. The encoder apparatus 6 outputs A-phase and B-phase incremental signals and an origin signal (Z-phase signal) with the travel of the carriage 2. The magnetic scale 4 is provided to generate the A-phase and B-phase incremental signals. The reference mark 7 is provided to generate the origin signal. The magnetic scale 4 and the reference mark 7 are attached to the track rail 1 in a stacked state. The head 5 is attached to the carriage 2.

The magnetic scale 4 has a rectangular shape in cross section and is long and slender along the track rail 1. A surface of the magnetic scale 4 is magnetized in such a manner that the north and south poles appear alternately at equal intervals in the length direction. The magnetic scale 4 is fitted into a groove in a top surface of the track rail 1. The attachment of the magnetic scale 4 is not limited to this. The magnetic scale 4 can also be attached to, for example, a track rail without a groove, or can also be attached to a side surface of the track rail.

Figure 2:
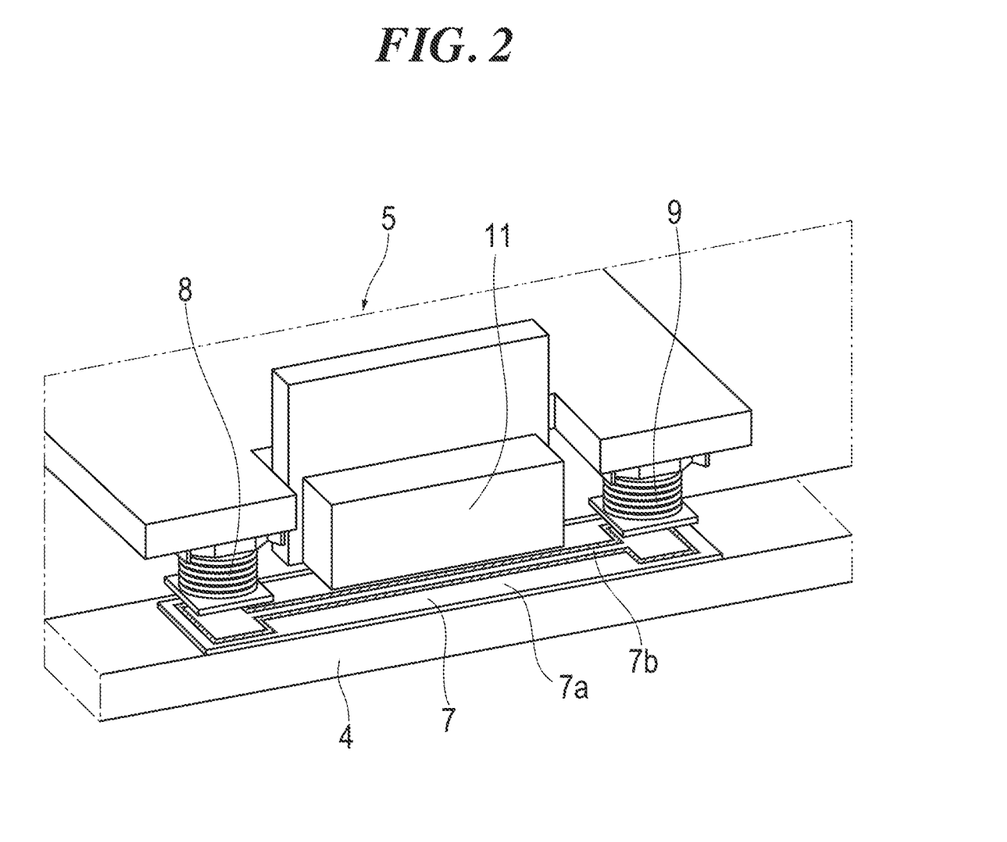
FIG. 2 is a perspective view illustrating an internal structure of the encoder apparatus according to the embodiment.

As illustrated in FIG. 2, the reference mark 7 is affixed to a top surface of the magnetic scale 4. As illustrated in a side view of FIG. 3, the reference mark 7 is affixed to a flat top surface 4a of the magnetic scale 4. If a recess corresponding to the thickness of the reference mark 7 is provided in the top surface 4a of the magnetic scale 4, a quantity of magnetism is different between a portion with the recess and a portion without the recess. Hence, the magnetic scale 4 is not provided with the recess. The reference mark 7 is formed of a rectangular flexible printed board that is long and slender in the length direction of the magnetic scale 4. The reference mark 7 includes a board 7a made of an insulator, and a pattern 7b made of a conductor and formed on a surface of the board 7a.

Figure 4:
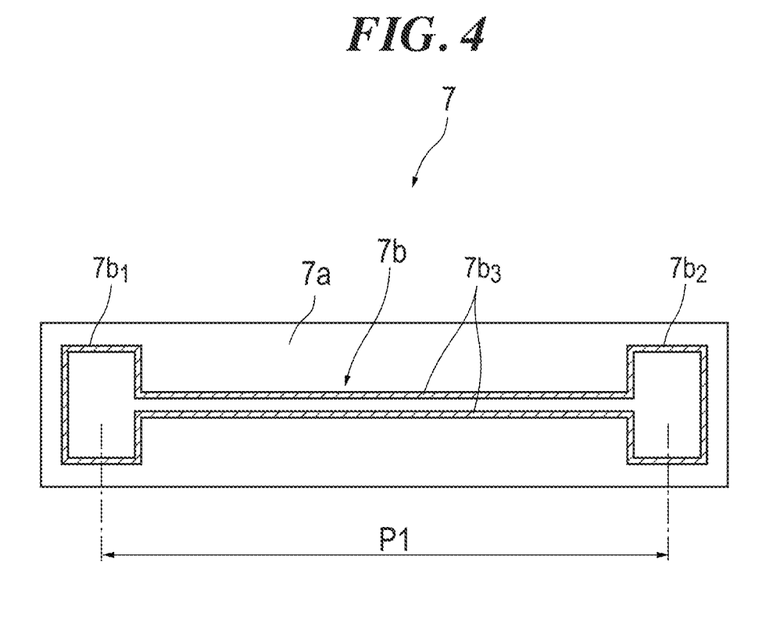
FIG. 4 is a plan view of a reference mark.

As illustrated in a plan view of FIG. 4, the pattern 7b includes a first scale coil $7b_1$ of a square frame shape, a second scale coil $7b_2$ of a square frame shape placed a predetermined pitch P1 apart in a travel direction of the head 5 from the first scale coil $7b_1$, and a parallel wire $7b_3$ connected to the first scale coil $7b_1$ and the second scale coil $7b_2$. The first scale coil $7b_1$, the second scale coil $7b_2$, and the parallel wire $7b_3$ configure a closed circuit.

Figure 3:
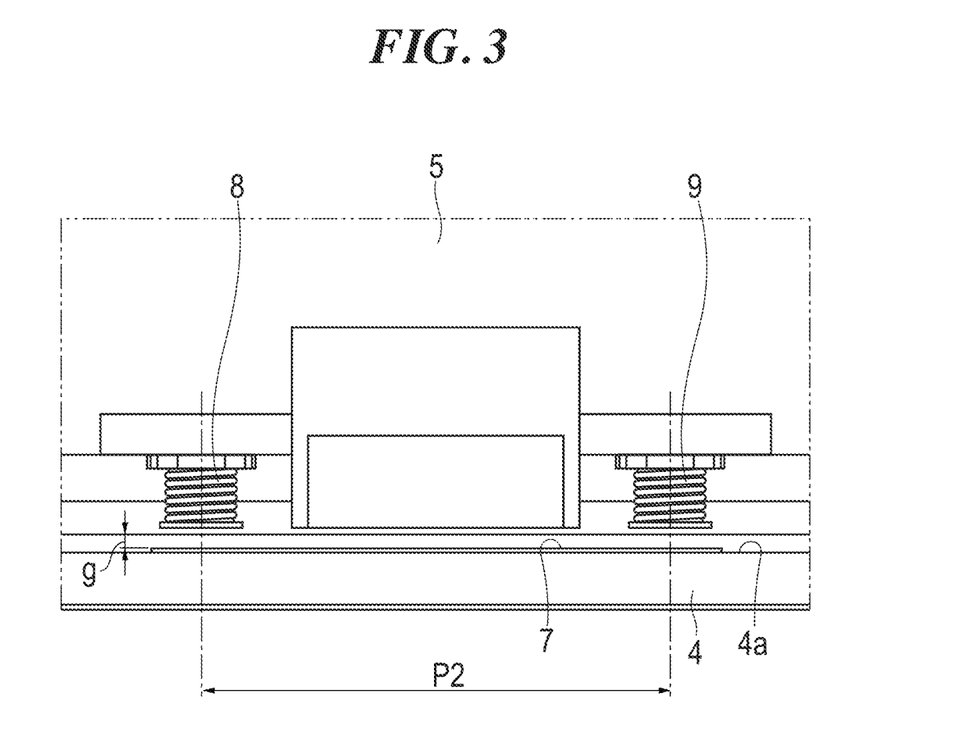
FIG. 3 is a side view illustrating the internal structure of the encoder apparatus according to the embodiment.

As illustrated in FIG. 2, the head 5 includes a transmitting coil 8 and a receiving coil 9. The transmitting coil 8 transmits an electromagnetic wave to the first scale coil $7b_1$ in a non-contact manner while facing the first scale coil $7b_1$. The receiving coil 9 receives an electromagnetic wave from the second scale coil $7b_2$ in a non-contact manner while facing the second scale coil $7b_2$. As illustrated in FIG. 3, a pitch between the centers of the transmitting coil 8 and the receiving coil 9 in the travel direction of the head 5 is P2. P2 is equal to the pitch P1 between the centers of the first scale coil $7b_1$ and the second scale coil $7b_2$. A gap g is provided between the transmitting coil 8 and the receiving coil 9, and the reference mark 7.

The head 5 can move with respect to the reference mark 7. When the transmitting coil 8 and the receiving coil 9 face the first scale coil $7b_1$ and the second scale coil $7b_2$, respectively, an electromagnetic wave emitted by the transmitting coil 8 is received by the receiving coil 9. When the head 5 moves from this facing position, the electromagnetic wave received by the receiving coil 9 gradually becomes small.

As illustrated in FIG. 2, a magnetic sensor 11 that reads the magnetic scale 4 is placed between the transmitting coil 8 and the receiving coil 9. The magnetic sensor 11 faces the magnetic scale 4 with a gap therebetween, and detects a magnetic field of the magnetic scale 4. The magnetic sensor 11 includes a MR (Magneto-Resistance) element. The MR element changes its resistance according to a change in the strength and/or direction of the magnetic field of the magnetic scale 4. When the head 5 moves with respect to the magnetic scale 4, the magnetic sensor 11 outputs two sinusoidal signals (an a-phase signal and a b-phase signal) that are 90 degrees out of phase with the travel of the head 5.

Figure 5:
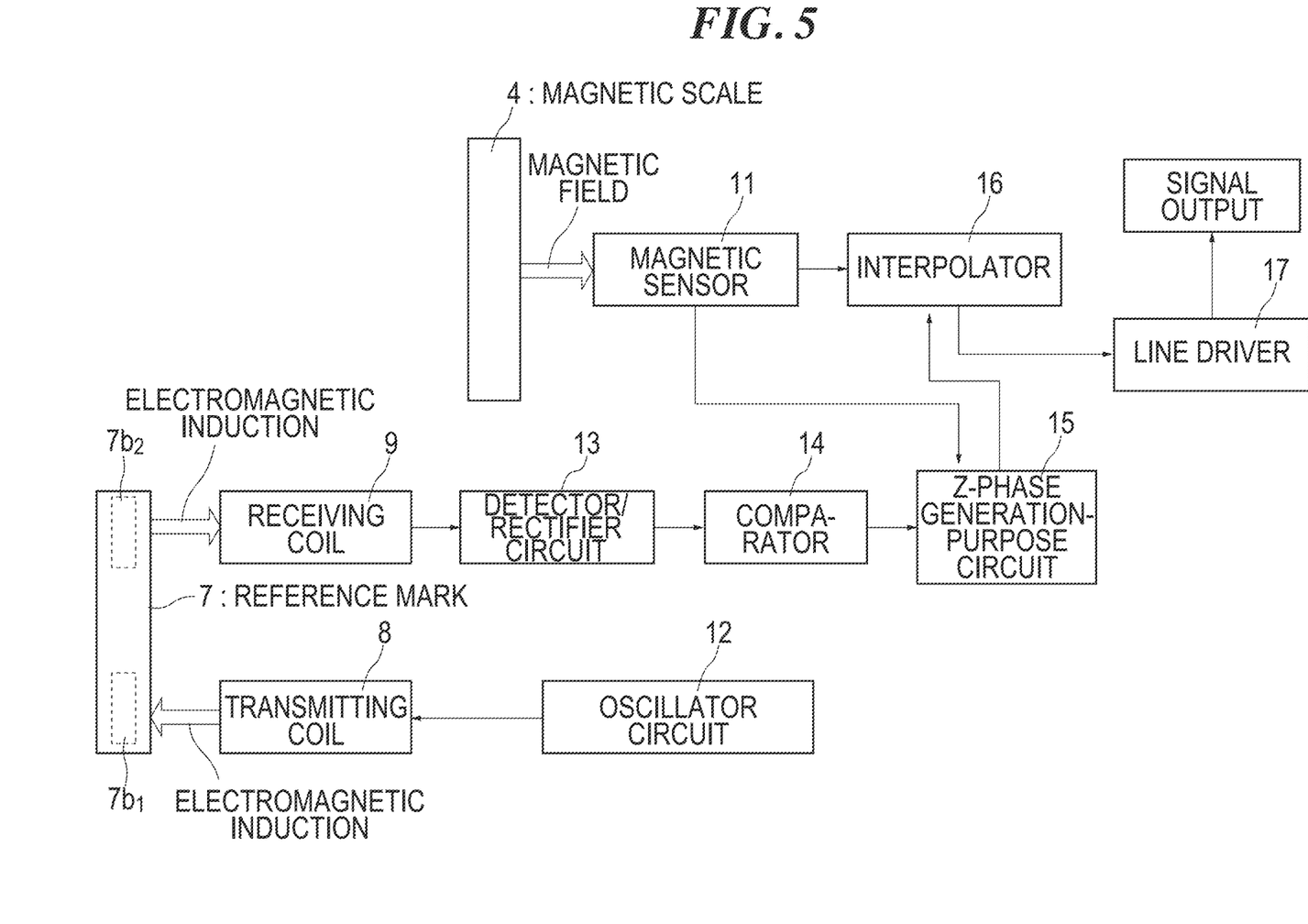
FIG. 5 is a block diagram of the encoder apparatus according to the embodiment.

FIG. 5 illustrates a block diagram of the encoder apparatus 6. The output of an oscillator circuit 12 that oscillates a predetermined frequency is inputted into the transmitting coil 8. The oscillation frequency of the oscillator circuit 12 is set to be equal to or greater than ten times the frequency of the magnetic field of the magnetic scale 4. The frequency of the magnetic field of the magnetic scale 4 is obtained from V/P. V is the speed (mm/sec) of the carriage 2, and P is the pitch (mm) between the magnetic poles (between the north pole and the north pole) of the magnetic scale 4.

The transmitting coil 8 receives the input from the oscillator circuit 12, and emits an electromagnetic wave. When the transmitting coil 8 faces the first scale coil $7b_1$ of the reference mark 7, the electromagnetic wave is captured by the first scale coil $7b_1$, and transmitted to the first scale coil $7b_1$.

The first scale coil $7b_1$ and the second scale coil $7b_2$ configure a closed circuit. When the first scale coil $7b_1$ receives the electromagnetic wave, the second scale coil $7b_2$ emits the electromagnetic wave. When the receiving coil 9 faces the second scale coil $7b_2$, the receiving coil 9 receives the electromagnetic wave.

The electromagnetic wave received by the receiving coil 9 is detected/rectified by a detector/rectifier circuit 13. The detector circuit detects the electromagnetic wave, isolates alternating current generated by the electromagnetic wave and alternating current generated by the magnetic scale 4 according to the frequencies, using a filter, and extracts the alternating current generated by the electromagnetic wave. The frequency of the alternating current generated by the electromagnetic wave is the order of MHz, whereas the frequency (V/P described above) of the alternating current generated by the magnetic scale 4 is the order of kHz. Hence, the filter can isolate them. The rectifier circuit rectifies the alternating current of the electromagnetic wave to direct current.

A comparator 14 compares the direct current voltage rectified by the detector/rectifier circuit 13 with a predetermined threshold, and generates a pulse for generating an origin signal. The comparator 14 generates a signal at H (High) level when the direct current voltage is equal to or greater than the predetermined threshold, and generates a signal at L (Low) level when the direct current voltage is less than the predetermined threshold. The pulse for generating an origin signal represents a state where the transmitting coil 8 and the receiving coil 9 are facing the first scale coil $7b_1$ and the second scale coil $7b_2$, respectively.

The pulse for generating an origin signal is inputted into a Z-phase generation-purpose circuit 15. The width of the pulse for generating an origin signal is relatively wide. The Z-phase generation-purpose circuit 15 is used to generate an origin signal with a narrow pulse width from the pulse for generating an origin signal. For example, the Z-phase generation-purpose circuit 15 generates a pulse with a narrow width from the a-phase signal and the b-phase signal outputted by the magnetic sensor 11 whenever the polarity of the magnetic scale 4 changes, and generates an origin signal with a narrow pulse width on the basis of the logical AND of the pulse with the narrow width and the pulse for generating an origin signal. An example of the Z-phase generation-purpose circuit 15 is described in Japanese Patent No. 5717787 proposed by the applicant. However, the Z-phase generation-purpose circuit 15 is not particularly limited.

An interpolator 16 is used to improve the resolution of the magnetic sensor 11. The interpolator 16 passes the a-phase signal and the b-phase signal outputted by the magnetic sensor 11 through an A/D converter, designates an address in a ROM table on the basis of A/D converted data obtained as a result of A/D conversion, and obtains interpolated data. A-phase and B-phase incremental signals with the resolution improved on the basis of the interpolated data are then obtained. The configuration of the interpolator 16 is known, and accordingly a detailed description thereof is omitted.

The origin signal and the A-phase and B-phase incremental signals, which have been obtained as described above, are outputted from a line driver 17 to a necessary control device.

The configuration of the encoder apparatus 6 of the present invention has been described above. According to the encoder apparatus 6 of the embodiment, the following effects are exerted.

A magnetic field generated on the reference mark 7 and a magnetic field generated on the magnetic scale 4 due to electromagnetic induction can be isolated according to the frequencies. Therefore, interference between the magnetic field of the reference mark 7 and the magnetic field of the magnetic scale 4 can be reduced.

Incremental detection is of the magnetic type (the magnetic scale 4 and the magnetic sensor 11 generate an incremental signal), and origin detection is of the electromagnetic induction type (the reference mark 7 and the transmitting and receiving coils 8 and 9 generate an origin signal). Accordingly, the encoder apparatus 6 that is excellent in being resistant to foreign substances (it is hard for foreign substances to adversely affect the accuracy of detection) can be obtained.

The magnetic scale 4 and the reference mark 7 are stacked and placed on the track rail 1. Attachment space for them can be reduced, and the head 5 can also be made compact in the width direction (the left-and-right direction orthogonal to the length direction of the track rail 1).

Figure 6A:
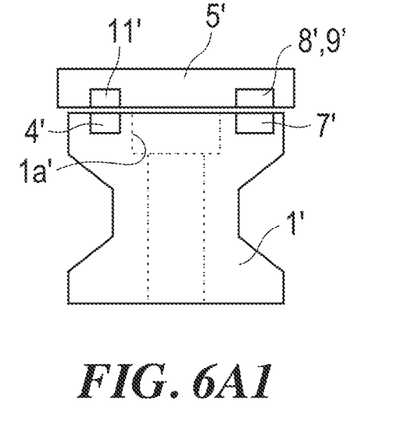
Figure 6A:
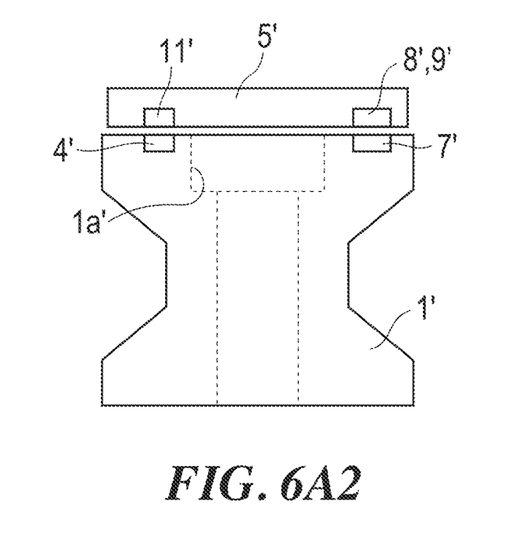
Figure 6B:
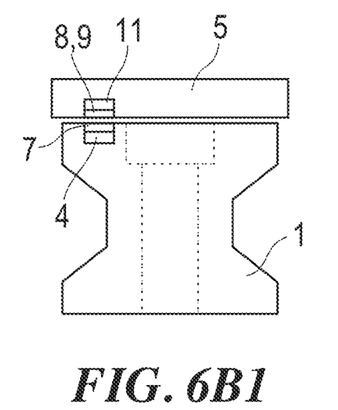
Figure 6B:
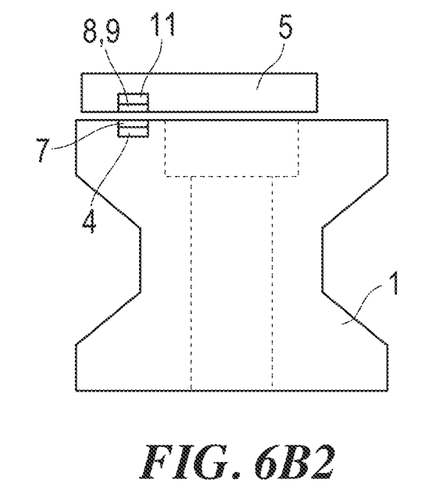

Moreover, as illustrated in FIGS. 6B1 and 6B2, the magnetic scale 4 and the reference mark 7 are stacked and placed on the track rail 1, which allows commonality of the head 5 between a motion guide apparatus B1 of a small model and a motion guide apparatus B2 of a large model. As illustrated in FIGS. 6A1 and 6A2 of a comparative example, if a magnetic scale 4' and a reference mark 7' are placed on the left and right of a bolt insertion hole $1a'$ of a track rail 1', commonality of a head 5' cannot be provided between a motion guide apparatus A1 of a small model and a motion guide apparatus A2 of a large model.

The magnetic sensor 11 is placed between the transmitting coil 8 and the receiving coil 9. Accordingly, the head 5 including them can be reduced in size, and also electromagnetic waves of the transmitting and receiving coils 8 and 9 can be prevented from adversely affecting the magnetic sensor 11.

The first scale coil $7b_1$ and the second scale coil $7b_2$ are apart in the travel direction of the carriage 2. Accordingly, the width of the reference mark 7 can be reduced.

The present invention is not limited to the realization of the embodiment, and can be realized in various embodiments within the scope that does not change the gist of the present invention.

For example, in the embodiment, the encoder apparatus detects a linear position of the carriage of the motion guide apparatus, but can also detect a rotation position of a rotary shaft of a motor.

The present description is based on Japanese Patent Application No. 2016-050530 filed on Mar. 15, 2016, the entire contents of which are incorporated herein.

REFERENCE SIGNS LIST

1 Track rail
2 Carriage
3 Motion guide apparatus
4 Incremental magnetic scale
5 Head
6 Encoder apparatus
7 Reference mark
$7b_1$ First scale coil
$7b_2$ Second scale coil
8 Transmitting coil
9 Receiving coil
11 Magnetic sensor
12 Oscillator circuit
13 Detector/rectifier circuit (electric circuit)
14 Comparator (electric circuit)

The invention claimed is:

1. An encoder apparatus comprising: a reference mark; and a head, wherein
   the reference mark includes a first scale coil, and a second scale coil electrically connected to the first scale coil,
   the head includes a transmitting coil configured to transmit an electromagnetic wave to the first scale coil in a non-contact manner, a receiving coil configured to receive the electromagnetic wave from the second scale coil in a non-contact manner, and an electric circuit configured to generate a pulse for generating an origin signal from the electromagnetic wave received by the receiving coil upon the transmitting coil facing the first scale coil and the receiving coil facing the second scale coil,
   the encoder apparatus further comprises an incremental magnetic scale,
   the head includes a magnetic sensor configured to read a magnetic field of the incremental magnetic scale, and
   the reference mark is placed on a top surface of the incremental scale in a stacked configuration.

2. The encoder apparatus according to claim 1, wherein the magnetic sensor is placed between the transmitting coil and the receiving coil.

3. The encoder apparatus according to claim 2, wherein the electric circuit includes:

a detector/rectifier circuit configured to detect the electromagnetic wave received by the receiving coil and rectify alternating current of the electromagnetic wave to direct current; and a comparator configured to compare the direct current voltage rectified by the detector/rectifier circuit with a predetermined threshold, and generate the pulse for generating an origin signal.

4. The encoder apparatus according to claim 2, wherein the encoder apparatus detects a position of a second member that moves relatively to a first member, and the first and second scale coils are placed apart in a relative travel direction of the second member.

5. The encoder apparatus according to claim 2, wherein a frequency of the electromagnetic wave transmitted by the transmitting coil is equal to or greater than ten times a frequency of a magnetic field of the incremental magnetic scale, the frequency of the magnetic field of the incremental magnetic scale is obtained from V/P, the encoder apparatus detects a position of a second member that moves relatively to a first member, the V is a relative speed of the second member to the first member, and the P is a pitch between magnetic poles of the incremental magnetic scale.

6. A motion guide apparatus with an encoder apparatus comprising:

the encoder apparatus according to claim 2;

a track rail to which the reference mark is attached; and a carriage to which the head is attached, the carriage being assembled to the track rail in such a manner as to be relatively movable.

7. The encoder apparatus according to claim 1, wherein the electric circuit includes:

a detector/rectifier circuit configured to detect the electromagnetic wave received by the receiving coil and rectify alternating current of the electromagnetic wave to direct current; and a comparator configured to compare the direct current voltage rectified by the detector/rectifier circuit with a predetermined threshold, and generate the pulse for generating an origin signal.

8. The encoder apparatus according to claim 7, wherein the encoder apparatus detects a position of a second member that moves relatively to a first member, and the first and second scale coils are placed apart in a relative travel direction of the second member.

9. The encoder apparatus according to claim 7, wherein a frequency of the electromagnetic wave transmitted by the transmitting coil is equal to or greater than ten times a frequency of a magnetic field of the incremental magnetic scale, the frequency of the magnetic field of the incremental magnetic scale is obtained from V/P, the encoder apparatus detects a position of a second member that moves relatively to a first member, the V is a relative speed of the second member to the first member, and the P is a pitch between magnetic poles of the incremental magnetic scale.

10. A motion guide apparatus with an encoder apparatus comprising:

the encoder apparatus according to claim 7;

a track rail to which the reference mark is attached; and a carriage to which the head is attached, the carriage being assembled to the track rail in such a manner as to be relatively movable.

11. The encoder apparatus according to claim 1, wherein the encoder apparatus detects a position of a second member that moves relatively to a first member, and the first and second scale coils are placed apart in a relative travel direction of the second member.

12. The encoder apparatus according to claim 1, wherein a frequency of the electromagnetic wave transmitted by the transmitting coil is equal to or greater than ten times a frequency of a magnetic field of the incremental magnetic scale, the frequency of the magnetic field of the incremental magnetic scale is obtained from V/P, the encoder apparatus detects a position of a second member that moves relatively to a first member, the V is a relative speed of the second member to the first member, and the P is a pitch between magnetic poles of the incremental magnetic scale.

13. A motion guide apparatus with an encoder apparatus comprising:

the encoder apparatus according to claim 1;

a track rail to which the reference mark is attached; and a carriage to which the head is attached, the carriage being assembled to the track rail in such a manner as to be relatively movable.

* * * * *